(12) United States Patent
Unno et al.

(10) Patent No.: US 6,490,041 B2
(45) Date of Patent: Dec. 3, 2002

(54) WAVEMETER

(75) Inventors: Yasushi Unno, Tokyo (JP); Shiori Sasaki, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 107 days.

(21) Appl. No.: 09/784,328

(22) Filed: Feb. 16, 2001

(65) Prior Publication Data

US 2001/0033385 A1 Oct. 25, 2001

(30) Foreign Application Priority Data

Feb. 17, 2000 (JP) ........................................ 2000-040188

(51) Int. Cl.[7] .................................................. G01B 9/02
(52) U.S. Cl. ........................................ 356/450; 356/451
(58) Field of Search .................................. 356/450, 451

(56) References Cited

U.S. PATENT DOCUMENTS 5,898,502 A * 4/1999 Horiuchi et al. ............ 356/416
6,115,122 A * 9/2000 Bao et al. .................... 356/345

* cited by examiner

*Primary Examiner*—Robert H. Kim
*Assistant Examiner*—Jurie Yun
(74) *Attorney, Agent, or Firm*—Oliff & Berridge, PLC

(57) ABSTRACT

A wavemeter for measuring a signal light which is obtained by multiplexing a plurality of optical signals in a predetermined system and which is transmitted, comprises: a reference setting unit for setting a reference value for measurement of the signal light obtained by the predetermined system, a measuring unit for continuously measuring the transmitted signal light, a specifying unit for specifying each optical signal multiplexed into the signal light, in accordance with a result of a measurement carried out by the measuring unit, a variation measuring unit for calculating a variation in a physical value of each optical signal specified by the specifying unit in accordance with the reference value for measurement, and an output unit for outputting a transition of the variation calculated by the variation measuring unit.

6 Claims, 5 Drawing Sheets

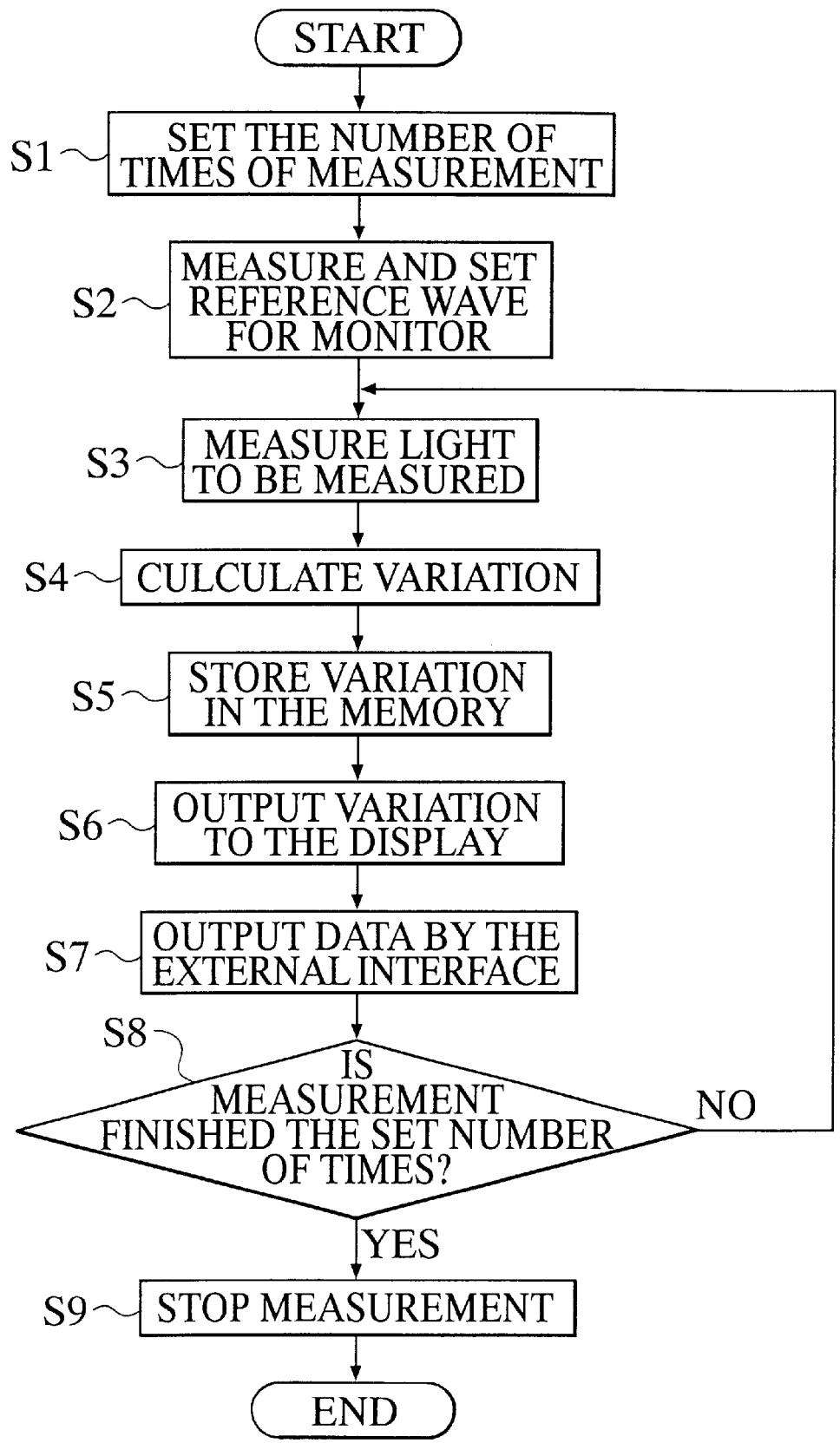

WAVEMETER

BACKGROUND OF THE INVENTION

1. Field of the Invention

The present invention relates to a wavemeter for measuring a wavelength of an optical signal (a light signal) multiplexed in a WDM (wavelength division multiplexing) technique or the like.

2. Description of the Related Art

In recent years, the information communications technology which is represented by Internet, portable telephones or the like has been developed remarkably. In proportion to the development of the technology, an amount of information which is transmitted through a transmission path for a predetermined time, increases rapidly. One of the most important transmission paths supporting the information communications technology is an optical fiber. A number of optical fibers have already been provided under the ground, on the bottom of the sea or the like. The optical fibers have been used actually.

In order to rapidly increase communication traffic capacity, new optical fibers are provided. Further, a system for transmitting a large amount of information at a high speed by using the existing optical fibers is desirable. One of the above systems is a WDM technique.

The WDM technique is one for using one optical fiber in multiple by utilizing the characteristic that lights having different wavelengths do not interfere with each other and by transmitting a plurality of optical signals having different wavelengths synchronically.

In the system using an optical signal having a single wavelength according to an earlier development, the data transfer rate is limited to 2.5 to 10 bps. In the WDM technique, a transfer capacity of several terabit per second can be realized, for example, by multiplexing one hundred twenty-eight 10-Gbps signals.

In order to realize the transmission using the WDM technique (hereinafter, referred to as "WDM transmission"), an apparatus for precisely evaluating a transmission property during the WDM transmission is required. As such an apparatus, a wavemeter for measuring and analyzing a spectrum of a plurality of optical signals has been developed.

In such a wavemeter, a function for monitoring a transition of a variation in a wavelength of an optical signal in a communication state during the WDM transmission, could not be realized.

When a wavelength of an optical signal or the like is varied beyond the range of the performance of the wavemeter in the WDM transmission, a quality of a signal remarkably deteriorates at a receiving part. Therefore, it is necessary that in the WDM transmission in which a plurality of optical signals are multiplexed, each multiplexed optical signal is monitored.

SUMMARY OF THE INVENTION

In order to solve the above-described problems, an object of the present invention is to monitor a transition of a variation in each optical signal multiplexed in the WDM transmission or the like and is to monitor a communication state during the WDM transmission.

That is, in accordance with one aspect of the present invention, a wavemeter for measuring a signal light which is obtained by multiplexing a plurality of optical signals in a predetermined system and which is transmitted, comprises:

a reference setting unit (for example, a CPU 6 shown in FIG. 1; Step S2 shown in FIG. 5) for setting a reference value for measurement of the signal light obtained by the predetermined system, a measuring unit (for example, a CPU 6 shown in FIG. 1; Step S3 shown in FIG. 5) for continuously measuring the transmitted signal light, a specifying unit (for example, a CPU 6 shown in FIG. 1; Step S3 shown in FIG. 5) for specifying each optical signal multiplexed into the signal light, in accordance with a result of a measurement carried out by the measuring unit, a variation measuring unit (for example, a CPU 6 shown in FIG. 1; Step S4 shown in FIG. 5) for calculating a variation in a physical value of each optical signal specified by the specifying unit in accordance with the reference value for measurement, and an output unit (for example, a CPU 6 shown in FIG. 1; Steps S6 and S7 shown in FIG. 5) for outputting a transition of the variation calculated by the variation measuring unit.

The variation calculated by the variation measuring unit may be a difference between an electric energy of each optical signal specified by the specifying unit and the reference value for measurement, which is set by the reference setting unit.

The variation calculated by the variation measuring unit may be a difference between a wavelength of each optical signal specified by the specifying unit and the reference value for measurement, which is set by the reference setting unit.

According to the present invention, because a variation of each measured optical signal, for example, a variation in an electric energy, that in a wavelength or the like, is calculated to output a transition thereof, it is possible to monitor the transition of the variation in a transmission status of a multiplexed signal light. Therefore, a temperature property of a light source, for example, used in the WDM transmission can be monitored.

The wavemeter may further comprise a setting unit (for example, a CPU 6 shown in FIG. 1; Step S1 shown in FIG. 5) for setting number of times of measurement of the signal light, wherein the transmitted signal light is continuously measured the number of times, which is set by the setting unit.

When the number of times of measurement of the signal light is set by the setting member, the measuring unit continuously measures the transmitted signal light the number of times, which is set by the setting unit. Therefore, the number of times of measurement can be set freely and the multiplexed signal light can be measured and monitored more freely.

The plurality of optical signals may be multiplexed by using a WDM technique.

It is possible to realize the wavemeter which can be applied to the WDM transmission which is used as a multiplexing method for an optical signal.

In accordance with another aspect of the present invention, a wavemeter comprises:

a reference setting unit for setting a reference physical value of each optical signal of a reference multiplexed light, an optical signal specifying unit for specifying each optical signal of a multiplexed light to be measured, a variation measuring unit for calculating a variation between the reference physical value of each optical signal of the reference multiplexed light, and a physical value of each optical signal of the multiplexed light to be measured, and an output unit for outputting the variation.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIG. 5 is a flow chart showing an operation of a monitoring process carried out by the CPU.

PREFERRED EMBODIMENT OF THE INVENTION

Hereinafter, an embodiment of the wavemeter according to the present invention will be explained in detail with reference to FIGS. 1 to 5.

The construction of the wavemeter will be explained.

The wavemeter 1 to which the present invention is applied, is one for measuring and monitoring a wavelength of an optical signal or the like in the WDM transmission. The wavemeter 1 is an apparatus in which a transition of a variation in each optical signal is measured on the basis of the reference signal for monitor by successively measuring each optical signal of a plurality of multiplexed signal waves the predetermined number of times and by comparing each optical signal with the reference wave for monitor, after the reference wave for monitor is inputted and set.

Figure 1:
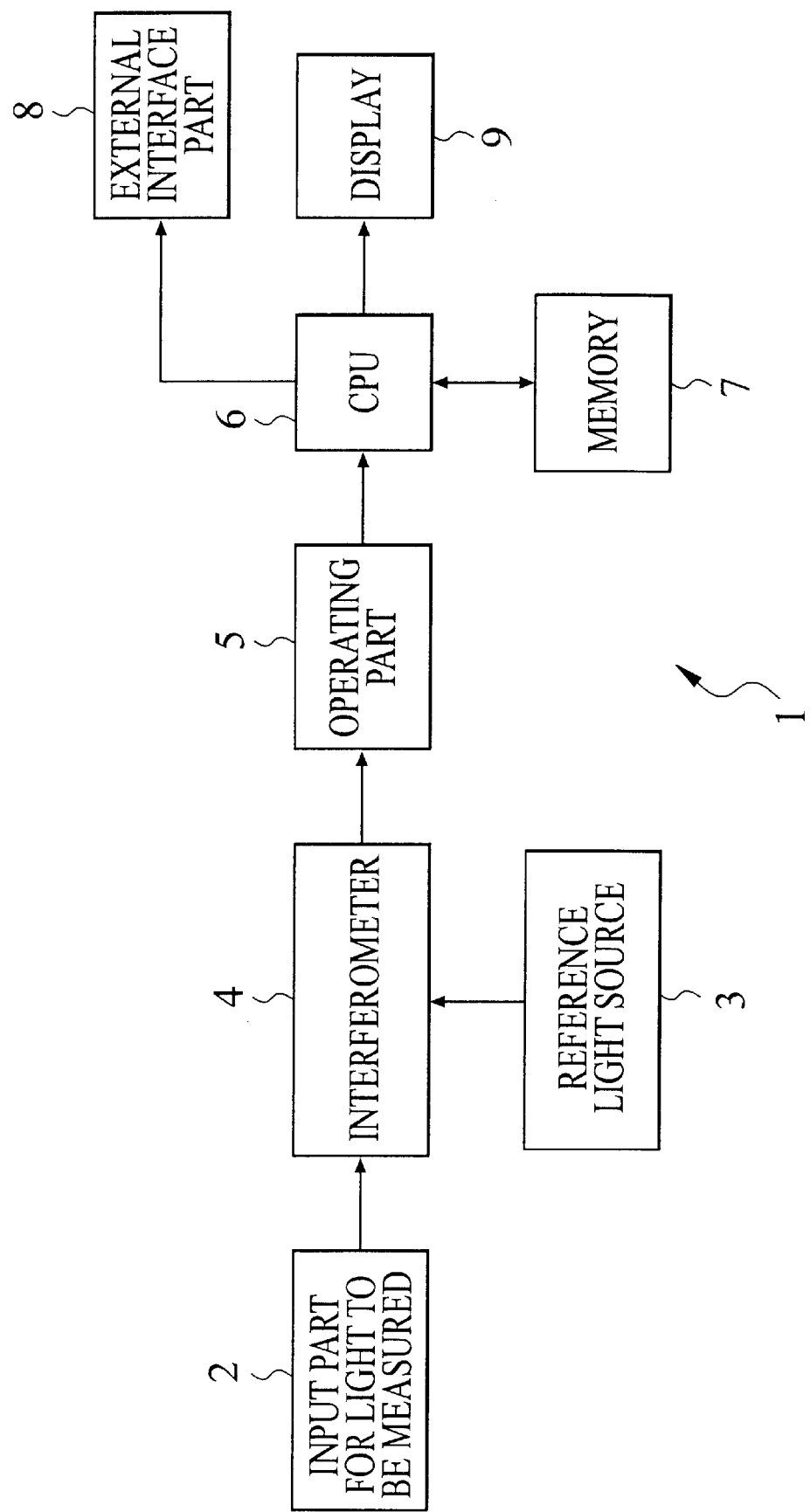
FIG. 1 is a block diagram showing a principal construction of the wavemeter for measuring and monitoring an optical signal.

FIG. 1 is a block diagram showing a principal construction of the wavemeter 1 for measuring and monitoring an optical signal. The block diagram shows a flow of signals between a plurality of principal elements during the measurement and the monitoring of each optical signal by using arrows. In FIG. 1, the wavemeter 1 comprises an input part 2 for light to be measured, a reference light source 3, an interferometer 4, an operating part 5, a CPU 6, a memory 7, an external interface part 8 and a display 9.

In FIG. 1, the input part 2 for light to be measured comprises a connector or the like, for connecting an optical fiber cable. The input part 2 outputs a light to be measured, which is transmitted by the WDM technique through the optical fiber cable (hereinafter, simply referred to as "light to be measured"), to the interferometer 4. In the light to be measured, a plurality of optical signals having different wavelengths are multiplexed.

The reference light source 3 comprises a DFB (Distributed Feed Back) laser or the like. The reference light source 3 is a light source for generating a reference light having a predetermined wavelength, for measuring an optical frequency, an optical wavelength and an electric energy of the light to be measured, which will be explained below. The generated reference light is outputted to the interferometer 4.

The interferometer 4 is a device for converting the light to be measured, which is outputted from the input part 2 for light to be measured, or the reference light outputted from the reference light source 3, into an electric signal having an energy in proportion to the optical frequency of the light. The electric signal is outputted to the operating part 5. The interferometer 4 comprises a prism lens and a reflective mirror for generating an interference waveform, a PD (Photo Diode) for converting the interference waveform into an electric signal, and the like. The interferometer 4 amplifies the light to be measured, which is outputted from the input part 2 for light to be measured, or the reference light outputted from the reference light source 3. The light to be measured and the reference light interfere with each other by using the prism lens, the reflective mirror and the like, to generate an interfere waveform. The PD detects the amount of light of the interfere waveform in order to convert the interfere waveform into an electric signal having a frequency which is proportional to the optical frequency (the optical wavelength) of the interfere waveform. The converted electric signal is outputted to the operating part 5.

The operating part 5 divides the electric signal outputted from the interferometer 4 into each frequency component. Each frequency component is outputted to the CPU 6. The CPU 6 calculates (measures) the optical frequency, the optical wavelength and the electric energy of the light to be measured, on the basis of the electric signal corresponding to the reference light, which is divided into each frequency component and the divided electric signal corresponding to the light to be measured.

The principle of measuring the optical frequency and the optical wavelength is derived from the following equations (1) and (2). Because the measuring principle is used in a wavemeter according to an earlier development, a detail explanation thereof is omitted.

(Optical frequency of the light to be measured)=((Speed of light)/(Frequency of interfere waveform of the reference light))×(Optical frequency of the reference light) (1)

(Optical wavelength of the light to be measured)=(Speed of light)/(Optical frequency of the light to be measured) (2)

The CPU 6 calculates (measures) the optical frequency of the light to be measured or the like, as described above. Further, the CPU 6 carries out a monitoring process (shown in FIG. 4) for the light to be measured, as follows. When the optical signal which is used as a reference wave for monitor and which is transmitted by using the WDM technique, is inputted into the input part 2 for light to be measured, each element carries out the same operation as the measurement of the light to be measured. Then, the electric signal is inputted into the CPU 6. The CPU 6 measures an electric energy, a wavelength or the like of each frequency component of an optical signal used as a reference wave for monitor. The measured values are stored in the memory 7.

After each value of the reference wave for monitor is set, the light to be measured, which is transmitted by the WDM technique, is inputted into the input part 2 for light to be measured. The CPU 6 measures an electric energy and a wavelength of the light to be measured. A variation of the light to be measured is calculated by comparing the electric energy, the wavelength or the like of the reference wave for monitor, with those of the light to be measured. The variation of the light to be measured is stored in the memory 7. The monitoring process is repeatedly carried out the set number of times.

The variations which are calculated in each measurement and which are stored in the memory, are displayed on the display 9 or are outputted to an external apparatus through the external interface part 8. A group of variations to be displayed at the same time, which are calculated in each measurement, are referred to as "transition of variation."

The process for measuring and monitoring a light to be measured, is carried out by the CPU 6 in accordance with a processing program. Such a processing program is stored in the memory 7 having a RAM (Random Access Memory) and the like.

Figure 2:
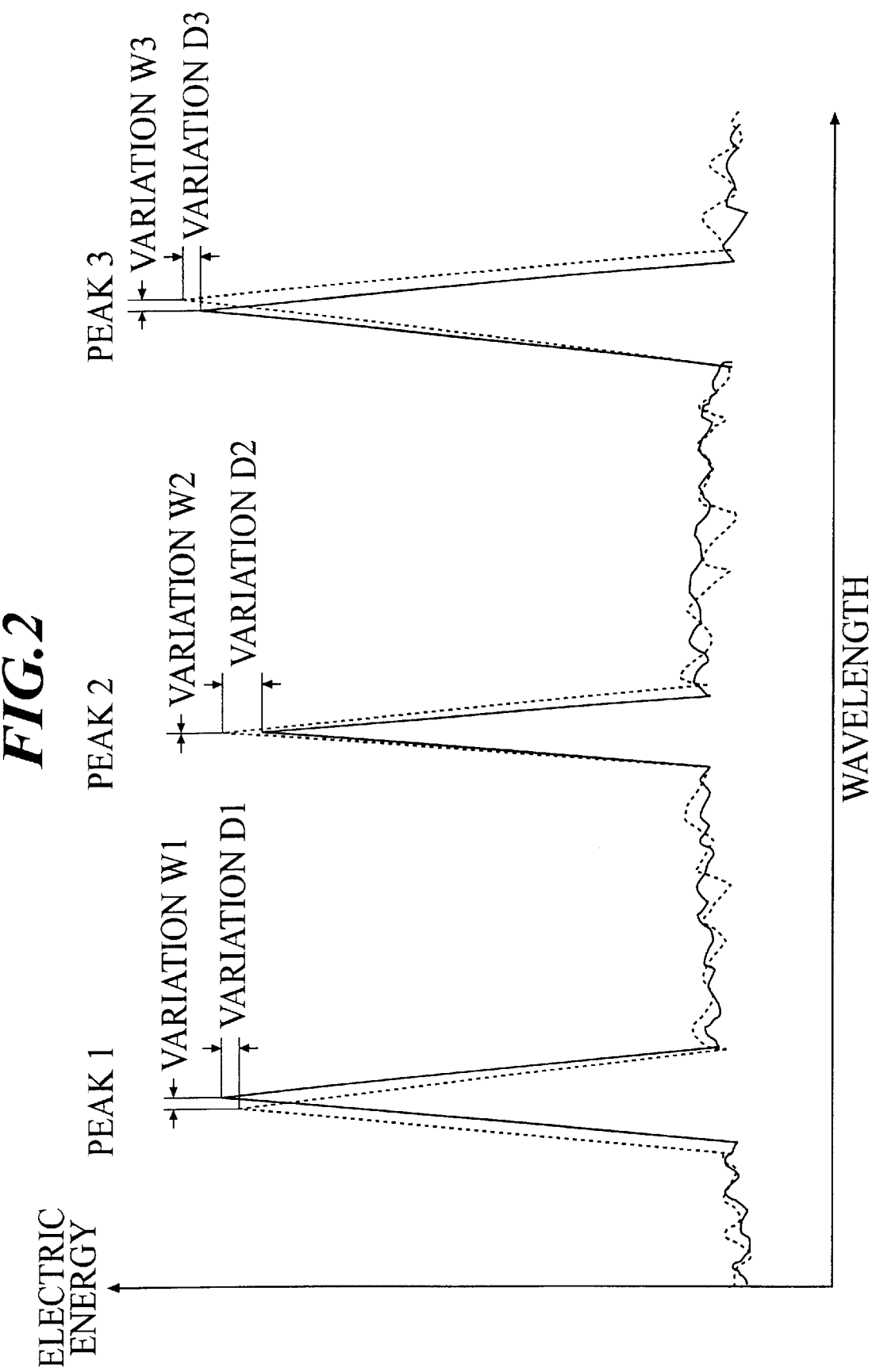
FIG. 2 is a view showing a waveform of a reference wave for monitor and that of a light to be measured in the WDM transmission.

A variation in an electric energy and a wavelength of a light to be measured, which are detected in the monitoring process will be explained with reference to the drawings. FIG. 2 is a view showing a waveform of a reference wave for monitor and that of a light to be measured in the WDM transmission.

In FIG. 2, the abscissa axis represents a wavelength having a value expressed by using the unit, for example, nm (nanometer). The ordinate axis represents an electric energy having a value expressed by using the unit, for example, dBm. A solid line represents a waveform of a light to be measured during the measurement. A broken line represents a waveform of a reference wave for monitor.

In FIG. 2, three peaks 1 to 3 show that three optical signals having different wavelengths are contained in a light to be measured. That is, three optical signals are multiplexed and is transmitted by using the WDM technique. Noise signals (noise) are transmitted or are propagated in the range of valley, that is, in the range except the peaks 1 to 3, for example, between the peak 1 and the peak 2 and between the peak 2 and the peak 3. Because a process for detecting the peaks has been used in a wavemeter according to an earlier development, the explanation of the process is omitted.

In three peaks 1 to 3, the difference between the waveform of the light to be measured and the waveform of the reference wave for monitor, that is, the variations D1 to D3 shown in FIG. 2 are variations in the electric energy of each optical signal multiplexed in the WDM transmission. The variations W1 to W3 are variations in the wavelength of each optical signal multiplexed in the WDM transmission.

Figure 3:
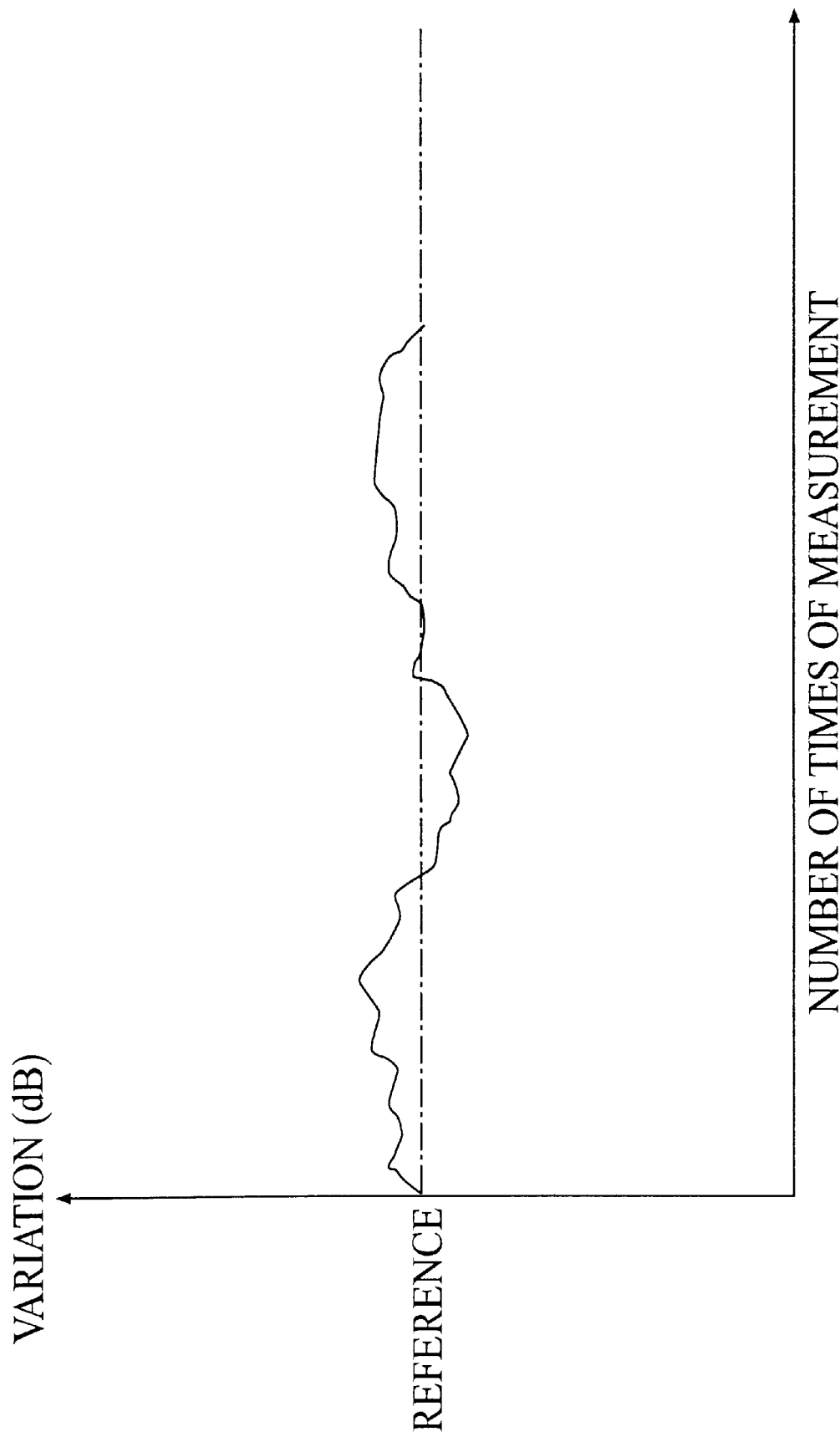
FIG. 3 is a view showing a transition of a variation in an electric energy of a light to be measured in the WDM transmission.

FIG. 3 is a view showing a transition of a variation in an electric energy in the WDM transmission. In FIG. 3, the abscissa axis represents the number of times of measurement. The ordinate axis represents a variation in an electric energy having a value expressed by using the unit, for example, dB (decibel). The variation in an electric energy shown in FIG. 3 indicates a variation in an electric energy at any one of peaks 1 to 3 shown in FIG. 2. Practically, the variations at all peaks are stored in the memory 7. A transition of variation in the electric energy is outputted to the display 9, or is outputted to an external apparatus through the external interface part 8.

Figure 4:
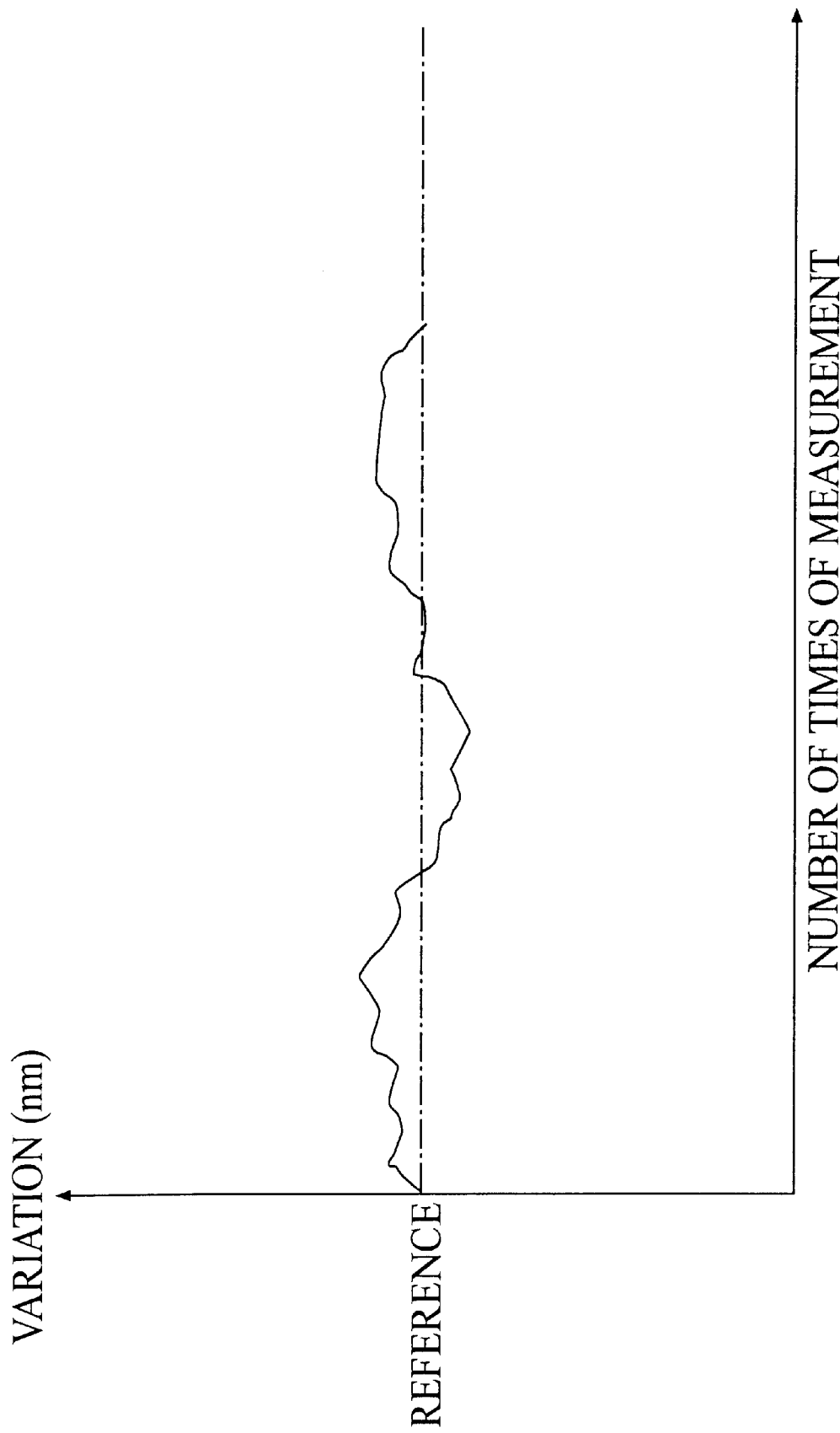
FIG. 4 is a view showing a transition of a variation in a wavelength of a light to be measured in the WDM transmission.

FIG. 4 is a view showing a transition of a variation in a wavelength in the WDM transmission. In FIG. 4, the abscissa axis represents the number of times of measurement. The ordinate axis represents a variation in a wavelength having a value expressed by using the unit, for example, nm (nanometer). The variation in a wavelength shown in FIG. 4 indicates a variation in a wavelength at any one of peaks 1 to 3 shown in FIG. 2. Practically, the variations at all peaks are stored in the memory 7. A transition of variation in the wavelength is outputted to the display 9, or is outputted to an external apparatus through the external interface part 8.

As described above, a transition of variation in an electric energy or in a wavelength is monitored by the CPU 6.

The memory 7 comprises a magnetic memory medium, an optical memory medium or a semiconductor memory. The memory 7 is fixedly provided on the wavemeter 1, or is removably attached to the wavemeter 1. The above program is stored in the memory 7. Further, data obtained by carrying out each process in accordance with the processing program and the like, are stored in the memory 7. For example, data relating to the number of times of measurement, which is set in the monitoring process (shown in FIG. 4), data relating to an electric energy and a wavelength at the peak of the reference wave for monitor, that is, reference values for measurement, data relating to a variation of each optical signal contained in a light to be measured, and the like are stored.

The external interface part 8 is a communication device using a wireless communication device or an optical fiber cable or the like. The external interface part 8 controls a data transmission between the wavemeter 1 and an external apparatus. For example, the external interface part 8 receives data relating to the number of times of measurement, which is set by an external apparatus disposed in a remote location, in order to transmit the data to the CPU 6. Further, the external interface part 8 transmits (outputs) a variation of a light to be measured, which is measured by the CPU 6, to the external apparatus.

The display 9 comprises a CRT (Cathode Ray Tube), a liquid crystal display or the like. The display 9 displays a display data outputted from the CPU 6.

Next, the operation of the wavemeter 1 will be explained.

FIG. 5 is a flow chart showing an operation of a monitoring process carried out by the CPU 6.

In FIG. 5, when the number of times of measurement of the light to be measured and to be monitored is inputted (Step S1), the CPU 6 stores the number of times of measurement in the memory 7 and sets the number of times of measurement. When an optical signal which is used as a reference wave for monitor and which is transmitted by using the WDM technique, is inputted into the input part 2 for light to be measured, an interference waveform of the reference wave for monitor is generated by the interferometer 4. After the interference waveform is converted into an electric signal, the electric signal is divided into each frequency component by the operating part 5.

The CPU 6 calculates (measures) the optical frequency (wavelength) and the electric energy from the electric signal of each frequency component. The wavelength and the electric energy are stored in the memory 7 and are set as a reference value (Step S2).

After the wavelength and the electric energy at the peak of the reference wave for monitor, are set, a light to be measured is inputted from the input part 2 for light to be measured. Like the measurement of the reference wave for monitor, the electric signal is inputted into the CPU 6 through the interferometer 4 and the like. The CPU 6 measures the light to be measured and displays the result of the measurement on the display 9 (Step S3).

The CPU 6 detects (specifies) a peak of each multiplexed optical signal in the light to be measured. The CPU 6 compares the wavelength and the electric energy at the peak of the reference wave for monitor (reference values for the measurement), with those at the peak of the light to be measured. The CPU 6 calculates a variation in the wavelength and a variation in the electric energy (Step S4).

That is, the CPU 6 calculates the difference in the wavelength at the peak between the reference wave for monitor and the light to be measured, and the difference in the electric energy at the peak therebetween. Then, the result of the calculation is stored in the memory 7 (Step S5).

The CPU 6 displays each variation stored in the memory 7 on the display 9 as a transition of a variation (Step S6). Then, the data is outputted to an external apparatus through the external interface part 8 (Step S7).

The CPU 6 judges whether the number of times of measurement of the light to be measured is equal to the number of times, which is set in the Step S1 (Step S8). When the measurement is not carried out the set number of times, the process is returned to the Step 3 in order to continue the measurement of the light to be measured. When the measurement has been carried out the set number of times, the measurement is stopped (Step S9). The monitoring process is finished.

As described above, according to the wavemeter 1 to which the present invention is applied, the reference wave for monitor is measured. The electric energy and the wavelength at the peak of the reference wave are set to the memory 7. Then, the light to be measured is measured. A peak of each signal waveform included in the light to be measured is specified. The wavelength and the electric energy at the peak of the reference wave for monitor (reference values for the measurement), are compared with those at the peak of the light to be measured, in order to calculate a variation in the wavelength and a variation in the electric energy. That is, the difference in the wavelength at the peak between the reference wave for monitor and the light to be measured, and the difference in the electric energy at the peak therebetween are calculated. These calculated differences are variations. The calculated variations are stored in the memory 7 and are displayed on the display 9 as a transition of a variation. The variation data is outputted to an external apparatus through the external interface part 8. These processes are repeated the set number of times.

Because the variations are outputted as a transition of a variation in every measurement, it is possible to easily monitor the transition of the variation at each peak of the multiplexed light to be measured. Therefore, for example, a temperature property of a light source used in the WDM transmission can be monitored. Further, it can be monitored whether a trouble occurs in an optical signal during the WDM transmission. Therefore, it is possible to monitor each optical signal in the WDM transmission in which a plurality of optical signals are multiplexed. Further, it is possible to provide an effective wavemeter for the maintenance of the WDM transmission or the like.

When the wavemeter is set in a relay station of an optical fiber or the like, it is necessary that the WDM transmission status is remotely monitored. However, because the transition of the variation obtained by the measurement and the abnormal status of the WDM transmission are outputted to an external apparatus through the external interface part 8, the transmission of the optical signal can be remotely monitored.

The present invention is not limited to the above-described embodiment. Any arrangement and construction may be changed without departing from the gist of the present invention. For example, an allowable range of the variation is set to the memory 7. When the CPU 6 judges that the variation is measured beyond the allowable range, a message that the variation is beyond the allowable range may be displayed on the display 9. In this case, it is possible to attempt a solution in which an abnormal optical signal is excluded and only normal optical signals are multiplexed in order to continue the WDM transmission or the like.

Although the transition of the variation in the electric energy and that in the wavelength are shown in each graph and the graphs are displayed on the display in the above embodiment, the numeral data may be outputted. Further, the transitions are outputted by incorporating them into a variation of another parameter.

According to the present invention, because a variation of each measured optical signal, for example, a variation in an electric energy, that in a wavelength or the like, is calculated to output a transition thereof, it is possible to monitor the transition of the variation in a transmission status of a multiplexed signal light. Therefore, a temperature property of a light source, for example, used in the WDM transmission can be monitored.

Further, because the number of times of measurement is set and a light to be measured can be measured the set number of times, the multiplexed signal light can be measured and monitored more freely.

Further, it is possible to realize the wavemeter which can be applied to the WDM transmission which is used as a multiplexing method for an optical signal.

The entire disclosure of Japanese Patent Application No. Tokugan 2000-40188 filed on Feb. 17, 2000 including specification, claims drawings and summary are incorporated herein by reference in its entirety.

What is claimed is:

1. A wavemeter for measuring a signal light which is obtained by multiplexing a plurality of optical signals in a predetermined system and which is transmitted, comprising:
   a reference setting unit for setting a reference value for measurement of the signal light obtained by the predetermined system,
   a measuring unit for continuously measuring the transmitted signal light,
   a specifying unit for specifying each optical signal multiplexed into the signal light, in accordance with a result of a measurement carried out by the measuring unit,
   a variation measuring unit for calculating a variation in a physical value of each optical signal specified by the specifying unit in accordance with the reference value for measurement, and
   an output unit for outputting a transition of the variation calculated by the variation measuring unit.

2. The wavemeter as claimed in claim 1, wherein the variation calculated by the variation measuring unit is a difference between an electric energy of each optical signal specified by the specifying unit and the reference value for measurement, which is set by the reference setting unit.

3. The wavemeter as claimed in claim 1, wherein the variation calculated by the variation measuring unit is a difference between a wavelength of each optical signal specified by the specifying unit and the reference value for measurement, which is set by the reference setting unit.

4. The wavemeter as claimed in claim 1, further comprising a setting unit for setting number of times of measurement of the signal light,
   wherein the transmitted signal light is continuously measured the number of times, which is set by the setting unit.

5. The wavemeter as claimed in claim 1, wherein the plurality of optical signals are multiplexed by using a WDM technique.

6. A wavemeter comprising:
   a reference setting unit for setting a reference physical value of each optical signal of a reference multiplexed light, an optical signal specifying unit for specifying each optical signal of a multiplexed light to be measured, a variation measuring unit for calculating a variation between the reference physical value of each optical signal of the reference multiplexed light, and a physical value of each optical signal of the multiplexed light to be measured, and an output unit for outputting the variation.

* * * * *